United States Patent
Rezayee et al.

(10) Patent No.: US 11,893,581 B1
(45) Date of Patent: Feb. 6, 2024

(54) TOKENIZATION FOR PAYMENT DEVICES

(71) Applicant: Square, Inc., San Francisco, CA (US)

(72) Inventors: Afshin Rezayee, Richmond Hill (CA); Murat Cat, Thornhill (CA)

(73) Assignee: Block, Inc., Oakland, CA (US)

( * ) Notice: Subject to any disclaimer, the term of this patent is extended or adjusted under 35 U.S.C. 154(b) by 374 days.

(21) Appl. No.: 15/900,433

(22) Filed: Feb. 20, 2018

(51) Int. Cl.
*G06Q 20/00* (2012.01)
*G06Q 20/38* (2012.01)
*G06K 7/00* (2006.01)
*G06Q 20/34* (2012.01)
*G06Q 20/40* (2012.01)

(52) U.S. Cl.
CPC ......... *G06Q 20/385* (2013.01); *G06K 7/0013* (2013.01); *G06Q 20/341* (2013.01); *G06Q 20/352* (2013.01); *G06Q 20/409* (2013.01)

(58) Field of Classification Search
CPC .......................... G06Q 20/385; G06K 7/0013
USPC .......................................................... 705/41
See application file for complete search history.

(56) References Cited

U.S. PATENT DOCUMENTS

| | | | |
|---|---|---|---|
| 5,276,311 A | 1/1994 | Hennige | |
| 5,530,232 A | 6/1996 | Taylor | |
| 5,585,787 A | 12/1996 | Wallerstein | |
| 5,878,337 A | 3/1999 | Joao et al. | |
| 6,175,922 B1 | 1/2001 | Wang | |
| 6,422,462 B1 | 7/2002 | Cohen | |
| 6,764,005 B2 | 7/2004 | Cooper | |
| 7,764,185 B1 | 7/2010 | Manz et al. | |
| 7,805,378 B2 | 9/2010 | Berardi et al. | |
| 8,190,514 B2 | 5/2012 | Bishop et al. | |
| 8,459,544 B2 | 6/2013 | Casey et al. | |
| 8,498,900 B1 | 7/2013 | Spirin et al. | |
| 8,577,803 B2 | 11/2013 | Chatterjee et al. | |
| 8,602,296 B1 | 12/2013 | Velline et al. | |
| 8,712,854 B1 | 4/2014 | Rafferty et al. | |

(Continued)

FOREIGN PATENT DOCUMENTS

EP 1 107 198 A2 6/2001
WO 2009/111857 A1 9/2009

OTHER PUBLICATIONS

Mobile Payment Solution—Symbiosis between banks, application service providers and mobile network operators Author: Natali Delic and Ana Vukasinovic (2006) (Year: 2006).*

(Continued)

*Primary Examiner* — Bruce I Ebersman
*Assistant Examiner* — John A Anderson
(74) *Attorney, Agent, or Firm* — Maynard Nexsen PC; Brian T. Sattizahn, Esq.

(57) ABSTRACT

A payment device such as electronic transaction card or an near field communication device can use a temporary token for payment transactions. When processing a payment transaction, the temporary token is provided to a server of the issuer of the payment device, which can authorize the payment transaction and determine if the temporary token can be used for a subsequent transaction. If the server determines that the temporary token cannot be used for another transaction, the server provides the payment device with a new temporary token and an issuer script. When the payment device receives the issuer script, the payment device can execute the issuer script to store the new temporary token on the payment device.

31 Claims, 6 Drawing Sheets

(56) References Cited

U.S. PATENT DOCUMENTS

| | | |
|---|---|---|
| 8,732,085 B2 | 5/2014 | Bennett |
| 8,972,298 B2 | 3/2015 | Kunz et al. |
| 9,092,767 B1 | 7/2015 | Andrews et al. |
| 9,092,776 B2 | 7/2015 | Dessert |
| 9,092,828 B2 | 7/2015 | Hosp |
| 9,836,739 B1 | 12/2017 | Borovsky et al. |
| 9,881,305 B1 | 1/2018 | Lewis et al. |
| 10,417,635 B1 | 9/2019 | Aaron |
| 10,621,563 B1 | 4/2020 | Spindel et al. |
| 2003/0204447 A1 | 10/2003 | Dalzell et al. |
| 2004/0138999 A1 | 7/2004 | Friedman et al. |
| 2005/0246245 A1 | 11/2005 | Satchell et al. |
| 2006/0131385 A1 | 6/2006 | Kim |
| 2006/0146839 A1 | 7/2006 | Hurwitz et al. |
| 2007/0150387 A1 | 6/2007 | Seubert et al. |
| 2007/0255653 A1 | 11/2007 | Tumminaro et al. |
| 2007/0255662 A1 | 11/2007 | Tumminaro |
| 2008/0052176 A1 | 2/2008 | Buchheit |
| 2008/0078831 A1 | 4/2008 | Johnson et al. |
| 2008/0177624 A9 | 7/2008 | Dohse |
| 2008/0197188 A1 | 8/2008 | Jagatic et al. |
| 2008/0270246 A1 | 10/2008 | Chen |
| 2009/0094126 A1 | 4/2009 | Killian et al. |
| 2009/0099961 A1 | 4/2009 | Ogilvy |
| 2009/0119190 A1 | 5/2009 | Realini |
| 2009/0266884 A1 | 10/2009 | Killian et al. |
| 2009/0288012 A1 | 11/2009 | Hertel et al. |
| 2009/0319638 A1 | 12/2009 | Faith et al. |
| 2010/0010906 A1 | 1/2010 | Grecia |
| 2010/0217674 A1 | 8/2010 | Kean |
| 2010/0217699 A1 | 8/2010 | Bookstaff |
| 2010/0269059 A1 | 10/2010 | Olthmer et al. |
| 2010/0306099 A1 | 12/2010 | Hirson et al. |
| 2011/0029416 A1 | 2/2011 | Greenspan |
| 2011/0035319 A1 | 2/2011 | Brand et al. |
| 2011/0071892 A1 | 3/2011 | Dickelman |
| 2011/0125633 A1 | 5/2011 | Aaltonen et al. |
| 2011/0145049 A1 | 6/2011 | Hertel et al. |
| 2011/0153438 A1 | 6/2011 | Dragt |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251962 A1 | 10/2011 | Hruska |
| 2011/0276418 A1 | 11/2011 | Velani |
| 2011/0313871 A1 | 12/2011 | Greenwood |
| 2012/0011062 A1* | 1/2012 | Baker ............... G06Q 20/105 |
| | | 705/41 |
| 2012/0084210 A1 | 4/2012 | Farahmand |
| 2012/0143772 A1 | 6/2012 | Abadir |
| 2012/0150643 A1 | 6/2012 | Wolfe et al. |
| 2012/0166311 A1 | 6/2012 | Dwight et al. |
| 2012/0166331 A1 | 6/2012 | Varsavsky Waisman-Diamond |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0209749 A1 | 8/2012 | Hammad et al. |
| 2012/0214416 A1 | 8/2012 | Kent et al. |
| 2012/0253852 A1 | 10/2012 | Pourfallah et al. |
| 2012/0254031 A1 | 10/2012 | Walker et al. |
| 2012/0271707 A1 | 10/2012 | Harrison et al. |
| 2012/0296726 A1 | 11/2012 | Dessert et al. |
| 2013/0019284 A1 | 1/2013 | Pacyga et al. |
| 2013/0041824 A1 | 2/2013 | Gupta |
| 2013/0054320 A1 | 2/2013 | Dorso et al. |
| 2013/0138563 A1 | 5/2013 | Gilder et al. |
| 2013/0144707 A1 | 6/2013 | Issacson et al. |
| 2013/0159081 A1 | 6/2013 | Shastry et al. |
| 2013/0159173 A1 | 6/2013 | Sivaraman et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0181045 A1 | 7/2013 | Dessert et al. |
| 2013/0204727 A1 | 8/2013 | Rothschild |
| 2013/0218697 A1 | 8/2013 | Kingston et al. |
| 2013/0218721 A1 | 8/2013 | Borhan et al. |
| 2013/0246203 A1 | 9/2013 | Laracey |
| 2013/0317835 A1 | 11/2013 | Mathew |
| 2013/0332354 A1 | 12/2013 | Rhee et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0032297 A1 | 1/2014 | Germann et al. |
| 2014/0052617 A1 | 2/2014 | Chawla et al. |
| 2014/0067557 A1 | 3/2014 | van Niekerk et al. |
| 2014/0074569 A1 | 3/2014 | Francis et al. |
| 2014/0074658 A1 | 3/2014 | Sanchez |
| 2014/0074691 A1 | 3/2014 | Bank et al. |
| 2014/0081783 A1 | 3/2014 | Paranjape et al. |
| 2014/0081853 A1 | 3/2014 | Sanchez et al. |
| 2014/0089073 A1 | 3/2014 | Jacobs et al. |
| 2014/0089078 A1 | 3/2014 | Dessert et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0114775 A1 | 4/2014 | Cloin et al. |
| 2014/0129942 A1 | 5/2014 | Rathod |
| 2014/0136349 A1 | 5/2014 | Dave et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0201067 A1 | 7/2014 | Lai et al. |
| 2014/0214652 A1 | 7/2014 | Zheng et al. |
| 2014/0249947 A1 | 9/2014 | Hicks et al. |
| 2014/0250002 A1 | 9/2014 | Issacson et al. |
| 2014/0279098 A1 | 9/2014 | Ham |
| 2014/0372300 A1* | 12/2014 | Blythe ............... G06Q 20/3676 |
| | | 705/41 |
| 2015/0012426 A1 | 1/2015 | Purves et al. |
| 2015/0032567 A1 | 1/2015 | Bhatia |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0120418 A1 | 4/2015 | Cervenka et al. |
| 2015/0134528 A1 | 5/2015 | Fineman et al. |
| 2015/0178755 A1 | 5/2015 | Olson et al. |
| 2015/0194023 A1 | 7/2015 | Brackenridge et al. |
| 2016/0012465 A1* | 1/2016 | Sharp ............... G06Q 20/386 |
| | | 705/14.17 |
| 2016/0232527 A1* | 8/2016 | Patterson ............... G06Q 20/401 |
| 2017/0270517 A1* | 9/2017 | Vasu ............... G07C 9/00309 |
| 2018/0268405 A1* | 9/2018 | Lopez ............... G06Q 20/3572 |
| 2019/0043039 A1* | 2/2019 | Wilson ............... G07F 7/0853 |

OTHER PUBLICATIONS

Non-Final Office Action dated Aug. 27, 2014, for U.S. Appl. No. 14/165,256, of Aaron, P., filed Jan. 27, 2014.
Non-Final Office Action dated Jan. 2, 2015, for U.S. Appl. No. 14/271,379, of Lewis, J., et al., filed May 6, 2014.
Final Office Action dated Mar. 17, 2015, for U.S. Appl. No. 14/165,256, of Aaron, P., filed Jan. 27, 2014.
Non-Final Office Action dated Apr. 27, 2015, for U.S. Appl. No. 14/184,503 of Borovsky, A., et al., filed Feb. 19, 2014.
Final Office Action dated Jun. 26, 2015, for U.S. Appl. No. 14/271,379, of Lewis, J., et al., filed May 6, 2014.
Non-Final Office Action dated Jul. 2, 2015, for U.S. Appl. No. 14/208,800, of Thome, J.P., et al., filed Mar. 13, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., et al., filed Feb. 25, 2014.
Non-Final Office Action dated Oct. 8, 2015, for U.S. Appl. No. 14/149,754, of Spindel, N., et al., filed Jan. 7, 2014.
Non-Final Office Action dated Oct. 8, 2015, for U.S. Appl. No. 14/165,256, of Aaron, P., filed Jan. 27, 2014.
Advisory Action dated Dec. 4, 2015, for U.S. Appl. No. 14/184,503, of Borovsky, A., et al., filed Feb. 19, 2014.

(56) References Cited

OTHER PUBLICATIONS

Final Office Action dated Dec. 31, 2015, for U.S. Appl. No. 14/208,800, of Thome, J.P., et al., filed Mar. 13, 2014.
Non-Final Office Action dated Mar. 31, 2016, for U.S. Appl. No. 14/271,379, of Lewis, J., et al., filed May 6, 2014.
Final Office Action dated Apr. 13, 2016, for U.S. Appl. No. 14/165,256, of Aaron, P., filed Jan. 27, 2014.
Final Office Action dated Apr. 28, 2016, for U.S. Appl. No. 14/189,880, of Aaron, P., et al., filed Feb. 25, 2014.
Non-Final Office Action dated Jun. 7, 2016, for U.S. Appl. No. 14/208,800, of Thome, J.P., et al., filed Mar. 13, 2014.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., et al., filed Feb. 25, 2014.
Final Office Action dated Oct. 6, 2016, for U.S. Appl. No. 14/271,379, of Lewis, J., et al., filed May 6, 2014.
Final Office Action dated Nov. 30, 2016, for U.S. Appl. No. 14/208,800, of Thome, J.P., et al., filed Mar. 13, 2014.
Final Office Action dated Dec. 27, 2016, for U.S. Appl. No. 14/184,503, of Borovsky, A., et al., filed Feb. 19, 2014.
Advisory Action dated Dec. 29, 2016, for U.S. Appl. No. 14/271,379, of Lewis, J., et al., filed May 6, 2014.
Non-Final Office Action dated Jan. 20, 2017, for U.S. Appl. No. 14/168,274, of Odawa, A.W., et al., filed Jan. 30, 2014.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Apr. 21, 2017, for U.S. Appl. No. 14/149,754, of Spindel, N., et al., filed Jan. 7, 2014.
Final Office Action dated May 19, 2017, for U.S. Appl. No. 14/168,274, of Odawa, A.W., et al., filed Jan. 30, 2014.
Notice of Allowance dated Jul. 6, 2017, for U.S. Appl. No. 14/184,503, of Borovsky, A., et al., filed Feb. 19, 2014.
Non-Final Office Action dated Aug. 4, 2017, for U.S. Appl. No. 14/526,337, of Wolter, J.A., filed Oct. 28, 2014.
Notice of Allowance dated Sep. 18, 2017, for U.S. Appl. No. 14/271,379, of Lewis, J., et al., filed May 6, 2014.
Final Office Action dated Dec. 1, 2017, for U.S. Appl. No. 14/149,754, of Spindel, N., et al., filed Jan. 7, 2014.
Non-Final Office Action dated Dec. 29, 2017, for U.S. Appl. No. 14/165,256, of Aaron, P., filed Jan. 27, 2014.
Final Office Action dated Mar. 14, 2018, for U.S. Appl. No. 14/526,337, of Wolter, J.A., filed Oct. 28, 2014.
Advisory Action dated Mar. 16, 2018, for U.S. Appl. No. 14/149,754, of Spindel, N., et al., filed Jan. 7, 2014.
Non-Final Office Action dated May 17, 2018, for U.S. Appl. No. 14/149,754, of Spindel, N., et al., filed Jan. 7, 2014.
Non-Final Office Action dated Jul. 6, 2018, for U.S. Appl. No. 14/526,337, of Wolter, J.A., filed Oct. 28, 2014.
Final Office Action dated Jul. 27, 2018, for U.S. Appl. No. 14/165,256, of Aaron, P., filed Jan. 27, 2014.
Advisory Action dated Oct. 4, 2018, for U.S. Appl. No. 14/165,256, of Aaron, P., filed Jan. 27, 2014.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
"Munson, J., and Gupta, V.K., ""Location-Based Notification as a General-Purpose Service,"" dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44".
Final Office Action dated Dec. 31, 2018, for U.S. Appl. No. 14/149,754, of Spindel, N., et al., filed Jan. 7, 2014.
Final Office Action dated Feb. 12, 2019, for U.S. Appl. No. 14/526,337, of Wolter, A., filed Oct. 28, 2014.
Non-Final Office Action dated Aug. 14, 2019, for U.S. Appl. No. 15/830,059, of Borovsky, A., et al., filed Dec. 4, 2017.
Notice of Allowance dated Oct. 18, 2019, for U.S. Appl. No. 14/208,800, of Thome, J.P., et al., filed Mar. 13, 2014.
Berger, S., et al.,"Web services on mobile devices—Implementation and Experience," Computer Society, Proceedings of the Fifth IEEE Workshop on Mobile Computing Systems and Applications, pp. 1-10 (Oct. 2003 ).
Delic, N., et al., "Mobile Payment Solution—Symbiosis Between Banks, Application Service Providers and Mobile Network Operators," Computer Society, Proceedings of the Third International Conference on Information Technology: New Generations (ITNG'06), pp. 1-5 (Apr. 2006).
Advisory Action dated Mar. 29, 2019, for U.S. Appl. No. 14/149,754, of Spindel, N., et al., filed Jan. 7, 2014.
Advisory Action dated Apr. 25, 2019, for U.S. Appl. No. 14/526,337, of Wolter, J.A., filed Oct. 28, 2014.
Notice of Allowance dated May 8, 2019, for U.S. Appl. No. 14/165,256, of Aaron, P., filed Jan. 27, 2014.
Non-Final Office Action dated Jul. 11, 2019, for U.S. Appl. No. 14/149,754, of Spindel, N., et al., filed Jan. 7, 2014.
Notice of Allowance dated Dec. 12, 2019, for U.S. Appl. No. 14/149,754, of Spindel, N., et al., filed Jan. 7, 2014.
Notice of Allowance dated Jan. 31, 2020, for U.S. Appl. No. 15/830,059, of Borovsky, A., et al., filed Dec. 4, 2017.
Notice of Allowance dated Feb. 20, 2020, for U.S. Appl. No. 14/208,800, of Thome, J.P., et al., filed Mar. 13, 2014.

\* cited by examiner

TOKENIZATION FOR PAYMENT DEVICES

BACKGROUND

There are various forms of payment devices available to consumers such as a payment card having a magnetic strip that is swiped in a magnetic reader of a payment terminal, a payment device (e.g., a payment card) having a Europay/Mastercard/Visa (EMV) chip that is inserted into corresponding EMV slot of the payment terminal, and near field communication (NFC) enabled devices such as a smart phone or a payment card with an EMV chip (an EMV card) that wirelessly communicate with the payment terminal and transmits payment information over a secure wireless connection. The payment terminal may receive the payment information from the payment device as well information about a transaction, and may communicate this information to a payment system for processing of the transaction.

The EMV card can store a unique key that is used each time the EMV card is used for a payment transaction. The unique key can be used to authenticate the EMV card and/or for encrypting the payment information provided to the payment reader. In order to obtain a unique key for the EMV card, the provider of the EMV card (also referred to as the card issuer) has to complete the Common Criteria for Information Technology Security Evaluation (referred to as "Common Criteria" or CC), which is an international standard (ISO/IEC 15408) for computer security certification. Completing the Common Criteria certification process can be a costly and lengthy endeavor for the card issuer.

One technique that can be used by a card issuer to avoid having to undertake the Common Criteria certification process is to provide a temporary key or token to the EMV card that is valid for a limited number of payment transactions (e.g., 1 payment transaction). Once the temporary key for the EMV card has been used for the limited number of payment transactions, the EMV card has to be provided with a new temporary key in order for the EMV card to be used for a subsequent payment transaction. However, it can be difficult for the owner of the EMV card to receive a new temporary key from the card issuer once the current temporary key for the EMV card can no longer be used since the card issuer is unable to communicate with the EMV card once a payment transaction has been completed.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
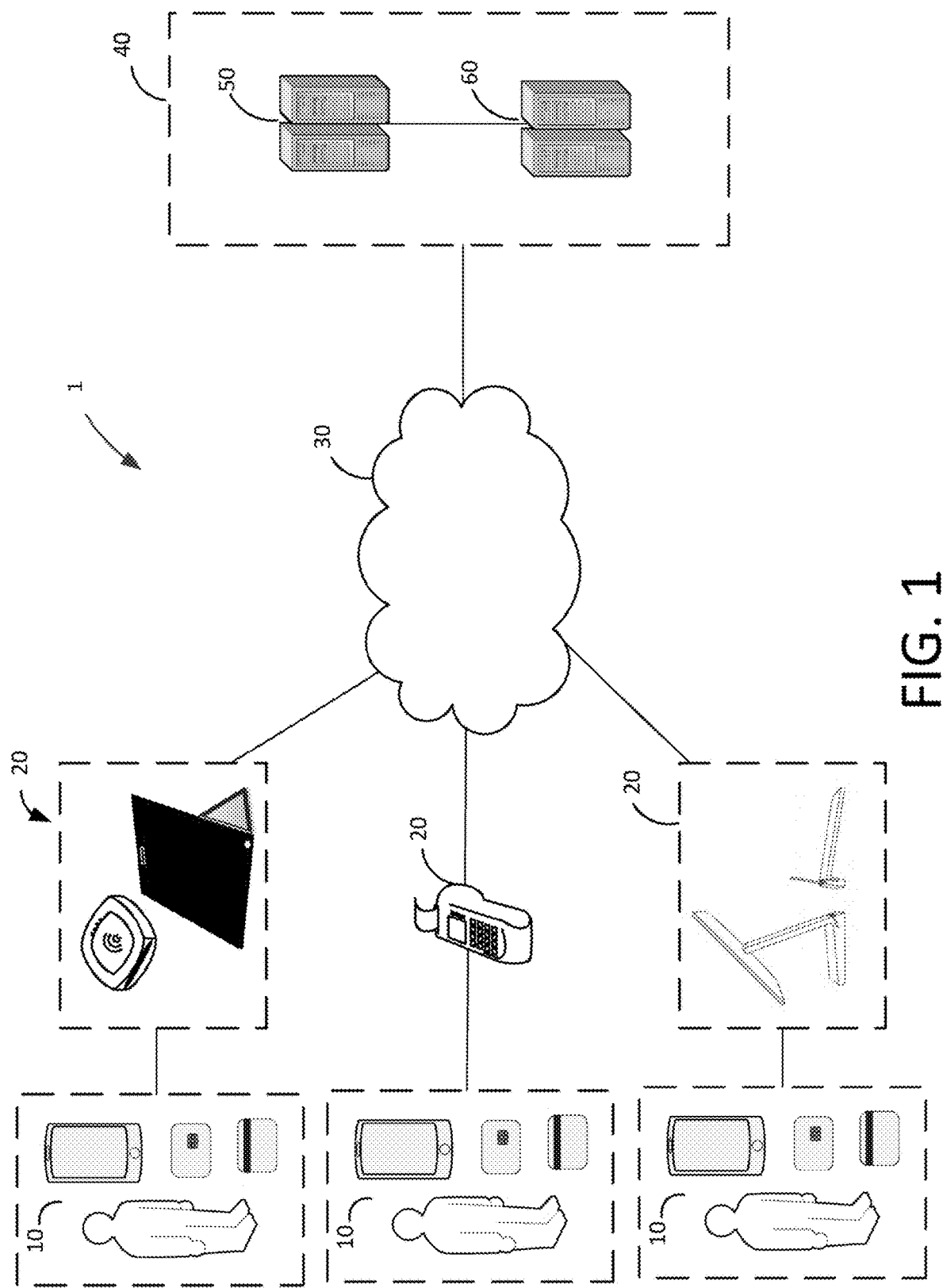
FIG. 1 shows an illustrative block diagram of a payment system in accordance with some embodiments of the present disclosure.

A payment device can be configured to use a temporary token or key for processing payment transactions. The temporary token or key can be provided by the issuer of the payment device and can be valid for one or more payment transactions. When the temporary token or key used by the payment device is no longer valid (i.e., the temporary token or key is no longer authorized for use in a payment transaction), the payment device can obtain a new temporary token or key. The new temporary token or key can be another valid temporary token or key stored in the memory of the payment device, if the payment device has stored multiple tokens or keys, or the new temporary token or key can be provided to the payment device by the issuer of the payment device.

The issuer of the payment device can provide a new temporary token or key to the payment device (or multiple temporary tokens or keys if the payment device is configured for multiple temporary tokens or keys) during the processing of a payment transaction using the payment device. When processing a payment transaction, the payment device can engage with a payment reader by insertion of the payment device with an EMV chip into a corresponding slot of the payment reader or by inductively coupling (or "tapping") the payment device and the payment reader to permit wireless communications. Once the payment device and the payment reader are engaged, the payment device and the payment reader can exchange payment information, which can include the temporary token or key.

The payment reader can then provide the payment information with the temporary token or key to a server operated by the issuer of the payment device (the issuer server). In an embodiment, the communication of the payment information and the temporary token or key from the payment reader to the issuer server may be encrypted. The issuer server can then process the temporary token or key and the other payment information to determine whether or not to authorize the payment transaction. In addition, the issuer server can determine if the temporary token or key is valid for another payment transaction (i.e., the temporary token or key can be used for another payment transaction). If the temporary token or key is valid for another payment transaction, the issuer server can provide the results of the authorization determination to the payment reader and/or the payment device and await another payment transaction.

If the temporary token is not valid for another payment transaction, the issuer server can provide one or more new temporary tokens or keys for the payment device. The issuer server can send the new temporary token(s) or key(s) in an issuer script to the payment device. The issuer script can be a software routine or program that can be executed by the processor of the payment device to replenish the temporary token or key at the payment device with the new temporary token(s) or key(s) that can be used for a subsequent payment transaction. The issuer server can provide the new temporary token(s) or key(s) in the issuer script to the payment reader, which can then provide the issuer script with the new temporary token(s) or key(s) to the payment device. In an embodiment, the communication of the issuer script with the new temporary token(s) or key(s) from the issuer server to the payment reader may be encrypted. The payment reader provides the issuer script with the new temporary token(s) or key(s) to the payment device when the payment reader and the payment device are engaged. If the payment device was inserted into the payment reader, the engagement of the payment reader and the payment device can be maintained while the payment device remains inserted in the payment reader. However, if the payment device was engaged by inductive coupling (or "tapping"), the payment reader can request the payment device be inductively coupled (or "tapped") at the payment reader a second time in order to permit the payment reader to provide the issuer script with the new temporary token(s) or key(s) to the payment device. The payment device can then execute the issuer script and store the new temporary token(s) or key(s) from the issuer script at the payment device for use in a subsequent payment transaction.

The temporary token or key can also be used as part of an anti-tampering mechanism for the payment device. The temporary token or key can be used to determine if a tamper event has occurred at the payment device. If a tamper event has occurred at the payment device, the issuer server can refuse to authorize payment transactions and can refuse to provide new temporary tokens or keys to the payment device. The issuer server can receive information about the payment device with the temporary token or key and then compare the information about the payment device with stored information about the payment device that is associated with the temporary token or key. If the payment device information does not match, the issuer server can determine that a tamper event has occurred at the payment device.

In an embodiment, a payment device that has a "permanent" token or key (i.e., a token or key that has been subjected to heightened security standards and can be used multiple times without a predetermined expiration time) can be reprogrammed to use temporary tokens or keys as described above. When the decision to reprogram the payment device with the permanent token or key is made, the issuer server can send a first issuer script to the payment device to reconfigure the payment device to use temporary tokens or keys. Once the payment device has been reconfigured, the issuer server can send a second issuer script to the payment device to store the new temporary token or key to be used by the payment device. As discussed above, the payment device has to be engaged with the payment reader as described above in order to receive the first and second issuer scripts.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank or issuer server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a merchant device, a payment reader, a standalone terminal, combined customer/merchant terminals, an electronic device (e.g., smart phone) executing a point-of-sale application, or other electronic device that is capable of processing payment information (e.g., encrypted payment card data and user authentication data) and transaction information (e.g., purchase amount and point-of-purchase information).

In some embodiments (e.g., for low-value transactions or for payment transactions that are less than a payment limit indicated by a NFC or EMV payment device 10), the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit to payment terminal 20 additional information such as transaction identifiers, scripts to be executed by the payment device 10 and data (e.g., credit limit information, payment tokens or keys, etc.) to be stored by the payment device 10.

Based on the information that is received at payment terminal 20 from payment server 40, the merchant may indicate to the customer whether the transaction has been approved. In some embodiments, such as when a chip card payment device is used, approval may be indicated at the payment terminal, for example, at a screen of a payment terminal. In other embodiments, such as a smart phone or watch operating as a NFC payment device, information about the approved transaction and additional information (e.g., receipts, special offers, coupons, or loyalty program information) may be provided to the NFC payment device for display at a screen of the smart phone or watch or for storage in memory.

Figure 2:
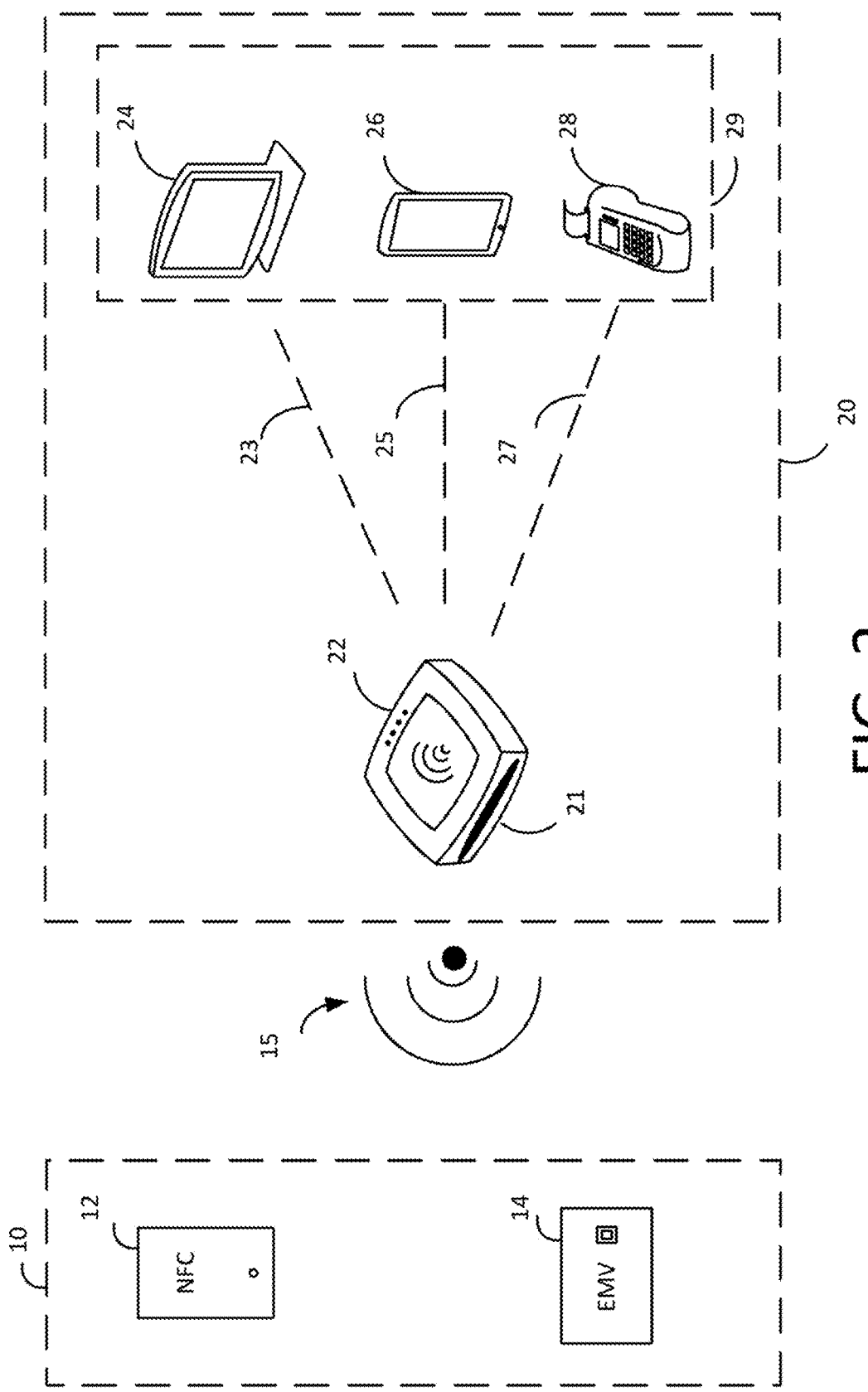
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may incorporate a payment reader 22 and a merchant device 29. However, it will be understood that as used herein, the term payment terminal may refer to any suitable component of the payment terminal 20, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an electronic transaction card 14, such as an EMV chip card 14.

Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 executes a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes a card (or EMV) slot 21 that is capable of receiving chip card 14. Chip card 14 may have contacts that engage with corresponding contacts of payment reader 22 when chip card 14 is inserted into card slot 21. Payment reader 22 provides power to an EMV chip of chip card 14 through these contacts and payment reader 22 and chip card 14 communicate through a communication path established by the contacts.

During transactions involving a chip card (or EMV card) 14, the EMV card 14 may be inserted into the card slot 21 of the payment reader 22. The payment reader 22 may make a number of electrical connections with the EMV card 14 including, inter alia, a power line, ground line, and data line. The EMV card 14 may have a processing element that is powered by the power and ground lines, and that performs various functions in conjunction with the payment reader 22, such as encryption, execution of scripts and communication of card and transaction information. In addition, the EMV card 14 and payment reader 22 exchange information that allows them to perform transaction processing.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the Internet and payment and transaction information may be communicated between payment terminal 20 and payment server 40 in an encrypted format such by a transport layer security (TLS) or secure sockets layer (SSL) protocol.

Figure 3:
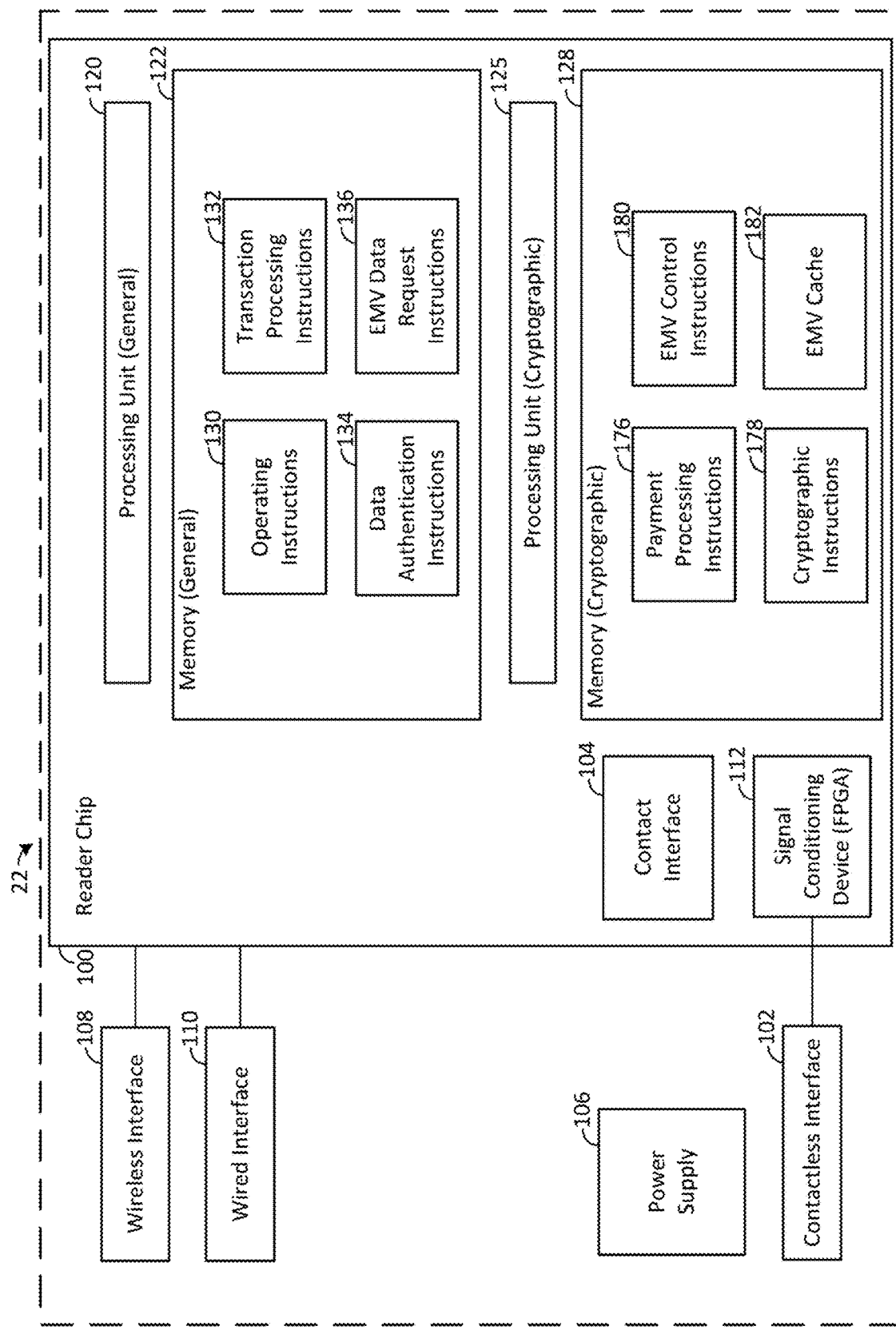
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may communicate with an interactive electronic device such as a merchant device 29 via wireless (e.g., using Bluetooth classic or Bluetooth low energy) or wired (e.g., using USB connectors) connections. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner.

In one embodiment, payment reader 22 includes a reader chip 100, a plurality of payment interfaces (e.g., a contactless interface 102 and a contact interface 104), a power supply 106, a wireless communication interface 108, a wired communication interface 110, and a signal conditioning device 112. Payment reader 22 (e.g., the reader chip 100 of payment reader 22) may also include a general processing unit 120 (e.g., a terminal/reader processing unit), general memory 122, a cryptographic processing unit 125 and cryptographic memory 128, a contact interface 104, and NFC signal conditioning device 112. Although in one embodiment, the processing units 120, 125, memories 122, 128, contact interface 104, and signal conditioning device 112 will be described as packaged in a reader chip 100, and configured in a particular manner, it will be understood that general processing unit 120, general memory 122, a cryptographic processing unit 125, cryptographic memory 128, contact interface 104, and signal conditioning device 112 may be located and configured in other suitable manners to perform the functionality of the payment reader 22 as is described herein. It will also be understood that the functionality of reader chip 100 may be embodied in a single chip or a plurality of chips, each including any suitable combination of processing units, memory and other components to collectively perform the functionality of reader chip 100 described herein.

In some embodiments, processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory (embedded or non-embedded), disks or optical storage, magnetic storage, or any other non-transitory medium that stores information that is accessed by a processor or computing device.

Reader chip 100 may also include additional circuitry (not depicted) such as interface circuitry, analog front end circuitry, security circuitry, and monitoring component circuitry. In one embodiment, the interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, HDMI and Lightning), circuitry for interfacing with other communication interfaces or buses (e.g., I$^2$C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to the processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In an embodiment, software routines running on each of the processing units may communicate with each other to exchange information, such as transaction processing information, requests for information, data objects, records, files, and similar information as described herein. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 may also include a signal conditioning device (or FPGA) 112 and analog front end circuitry for interfacing with the contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHz. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader 22 and the chip card 14 are able to exchange information such as record requests, scripts, security information (e.g., tokens or keys), account information (e.g., credit limits) and payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When the power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may include a processing unit (not depicted) and memory (not depicted).

Wired communication interface 110 may include any suitable interface for wired communication with other devices or a communication network, such as USB, Lightning, FireWire, HDMI, mobile HDMI, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may include an FPGA. Signal conditioning device 112 may condition sent and received signals to and from contactless interface 102, such as when a payment device 10 using NFC communication communicates with payment reader 22. In an embodiment, signal conditioning device 112 may operate based on instructions stored at reader chip 100 for use in interacting with the contactless interface 102.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, and EMV data request instructions 136.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing instructions stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations, such as acquisition of records and/or information from the EMV card 14. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK instructions may be tailored for a particular jurisdiction (e.g., country-specific).

EMV data request instructions 136 may include instructions that when executed by a processing unit (e.g., a software routine run by the processing unit 120) may prioritize and process the acquisition and processing of EMV data that is obtained from an EMV card 14. EMV data may be required at a variety of stages of a transaction, for example, based on steps that occur within instructions such as the transaction processing instructions 132 or data authentication instructions 134. At a stage where data is required, the transaction processing instructions 132 or data authentication instructions 134 may request the data or perform operations that require access to the data.

Cryptographic processing unit 125 may be any suitable processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176, cryptographic instructions 178, and EMV control instructions 180. In an embodiment, cryptographic memory 128 may also include an EMV cache 182, which may provide quickly accessible storage of information relating to the EMV card and transactions.

Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

In an embodiment, EMV control instructions 180 may facilitate the acquisition of records from an EMV card 14 and the processing of requests for data contained in those records. EMV cache 182 may store information about data acquired from the EMV card 14 as described herein. By maintaining and querying the EMV cache 182, and otherwise managing and prioritizing requests for data from other software routines of the payment reader 22, and record requests and other communications with the EMV card 14, EMV control instructions 180 may facilitate parallel processing of transactions with the accessing of records and/or data from the EMV card 14, and in some instances, may permit the completion of transaction processing prior to the acquisition of all records and/or data from an EMV card 14.

Upon receipt of a data request (e.g., from EMV data request instructions 136), the EMV control instructions 180 may perform a number of steps to return the requested data. In an embodiment, the EMV control instructions 180 may first query the EMV cache 182 to determine whether the data has already been obtained and stored. If not, it may be determined from the data or other information provided with the data (e.g., transaction processing step, etc.) whether a known or probable location of the data within the EMV card 14 can be identified.

In an embodiment, EMV control instructions 180 may assist with data and record requests during payment transactions. EMV control instructions 180 may assist with predictive requesting of data or records, execution of rules for identifying records, and parallel processing of payment transaction steps.

EMV control instructions 180 may also provide data to the issuer server 60 from payment reader 22. This information may include the token or key, data locations, card information, customer information, data-record associations, utilization of records and data in processing payment transactions (e.g., identification of records that include data that is frequently or infrequently used in payment transactions), and other similar information. This information may be forwarded to the issuer server 60, and in some embodiments, additional information may be appended. The additional information may be any suitable information that may be acquired by the payment terminal 20, such as customer information, customer preference information, geographic information, store-specific information, purchased items, etc.

Although in the embodiment depicted in FIG. 3, the EMV data request instructions 136 are depicted and described as being stored within memory 122 and executed by the processing unit 120, it will be understand that EMV data request instructions may be stored at other memory (e.g., cryptographic memory 128) and executed by other processors (e.g., cryptographic processing unit 125). In a similar manner, EMV control instructions 180 and EMV cache 182 may be stored other than at cryptographic memory 128 (e.g., at general memory 122) and may be utilized or executed at other processors (e.g., by general processing unit 120). Moreover, it will be understood that any of the instructions or cache may be stored at multiple memories, and that any of the functionality related to EMV data processing described herein may be combined in any suitable manner (e.g., into a single software routine or into additional software routines).

Figure 4:
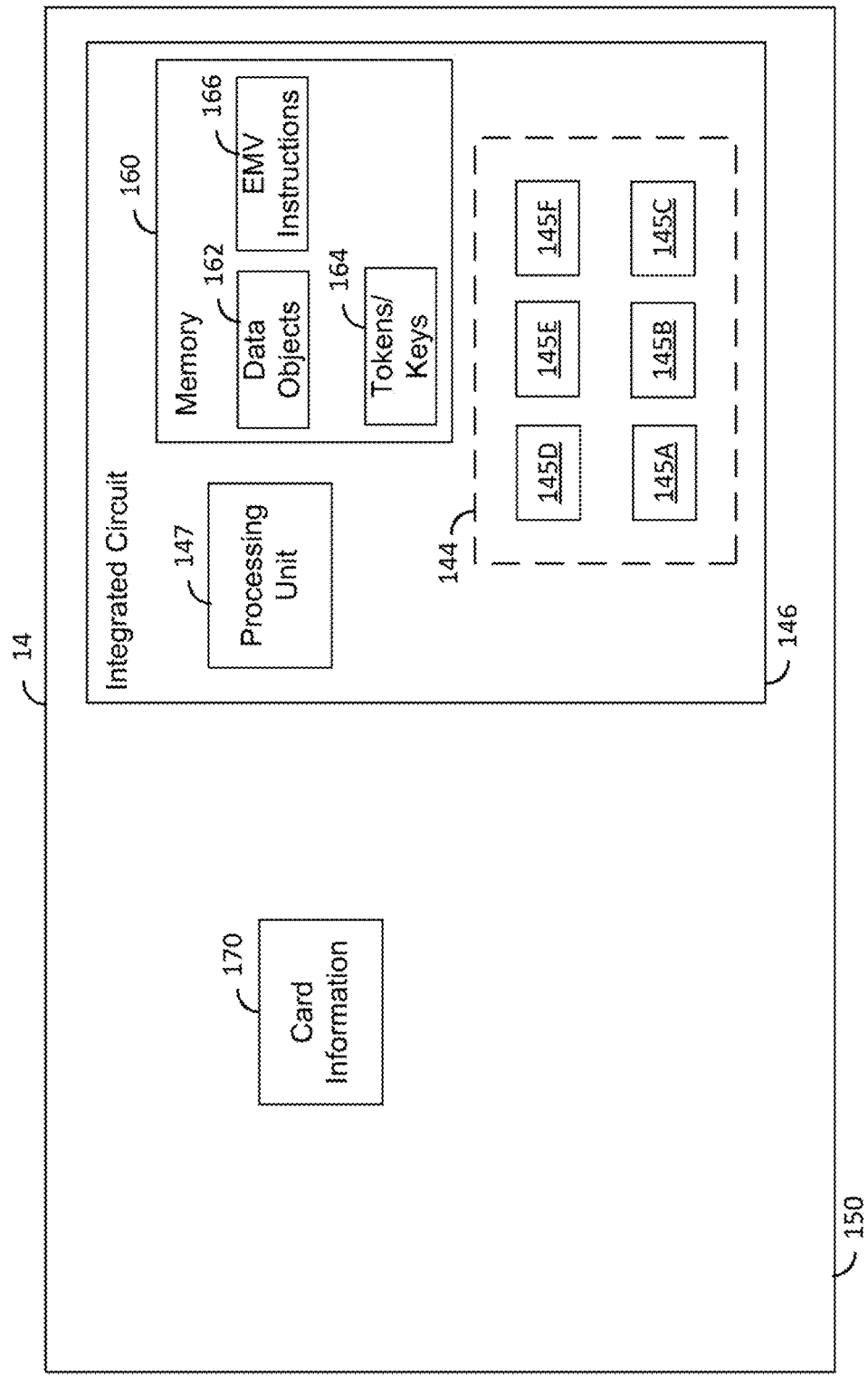
FIG. 4 depicts an illustrative block diagram of a chip card in accordance with some embodiments of the present disclosure.

FIG. 4 depicts an exemplary payment card or chip card 14 in accordance with some embodiments of the present disclosure. Although particular components are depicted in a particular arrangement in FIG. 4, it will be understood that the chip card or EMV card 14 may include additional components, one or more of the components depicted in FIG. 4 may not be included in the chip card 14, and the components of the chip card 14 may be rearranged in any suitable manner. In one embodiment, the chip card 14 includes a card body 150 with an integrated circuit or chip 146 and card information 170. The integrated circuit 146 can include a processing unit 147, a memory 160 with data objects 162, tokens/keys 164, and EMV instructions 166, and an interface 144 having contacts 145A-145F.

The chip card 14 includes a card body 150 (also referred to as a substrate). The card body 150 can be substantially flat and have a size of 85.60 mm by 53.98 mm and a thickness of less than 0.8 mm, which dimensions conform to the ISO/IEC 7810 standard. In one embodiment, the card body 150 can have embossed on its surface card information 170 such the card number, expiration date, and name of the card holder. In another embodiment, the card body can have an embedded magnetic stripe (not shown) with stored information such as card information 170 and other information used in processing a payment transaction. The integrated circuit 146 (also referred to as electronic circuitry or chip 146) is attached to or embedded in the substrate 150. The card body 150 can be formed from any of various materials, such as metal, paper, fiber, celluloid plastic, or polyvinyl chloride (PVC) plastic.

The chip or integrated circuit 146 includes a reader interface 144, which includes multiple contacts 145A-145F. Among these contacts 145A-145F, the contact 145A can be a ground (GND) contact for ground reference voltage. The contacts 145B-145E can be data contacts having various purposes. The contact 145F can be a power supply contact, which draws an electrical current from a card reader (e.g., card reader 22) when the chip 146 of chip card 14 is connected with the card reader 22. The positions and shapes of the contacts 145A-145F are designed to make good electrical contact with corresponding contact pins of the card reader 22. In one embodiment, the electrical contacts 145 can include metal or other electrical conductor materials. In another embodiment, the electrical contacts 145 can be in the form of pins, or alternatively be balls of a ball grid array, or any other known or convenient form of electrical contacts. In one embodiment, the electrical contacts 145 can be electrically coupled to the chip 146 using multiple bond wires (not shown).

In one embodiment, the integrated circuit 146 of chip card 14 includes a processing unit 147 and memory 160 that are configured to control and perform the necessary operations of the chip card 14. In one embodiment, the processing unit 147 may be a high-speed processor executing instructions for an operating system of the chip card, programs, and applications based on instructions that may be stored in memory 160. The memory 160 may include any suitable memory types or combination thereof as described herein for storing instructions and other data and providing a working memory for the execution of the operating system, programs, and applications of the chip card 14. In one embodiment, the memory may include a plurality of sets of instructions, including but not limited to EMV instructions 166. Memory 160 may also include data object storage 162 and token/key storage 164, which may provide for storage of information such as tokens or keys relating to processing EMV payment transactions.

In an embodiment, the EMV instructions 166 can include the corresponding operating system and/or applications for executing EMV payment transactions with the payment device 10 based on the payment method supported by the payment device 10. For example, if the payment device 10 is intended for processing payment transaction in accordance with a particular payment method (e.g., VISA), the operating system and applications stored in the EMV instructions 166 would be configured such that the operating system and applications were within the specifications established by EMVCo for the payment method.

In an embodiment, the EMV instructions 166 can also include instruction for processing tokens. The EMV instructions 166 can tokenize a key or other information stored in memory 160 for transmission to the payment reader 22 and/or issuer server 60. Similarly, the EMV instructions 166 can also de-tokenize any received tokens and store the corresponding key or other information in memory 160.

The processing unit 147 may execute the instructions of memory 160 to interact with and control one or more other components of the chip card 14. Although the processing unit 147 may communicate with other components of the chip card 14 in any suitable manner, in one embodiment the processing unit 147 may utilize an interface bus (not shown). Interface bus may include one or more communication buses such as I2C, SPI, USB, UART, and GPIO. In one embodiment, the processing unit 147 may execute instructions of the memory 160 and based on those instructions may communicate with the other components of the chip card 14 via the communication buses of the interface bus.

In an embodiment, the processing unit 147 and memory 160 can be combined into a single chip and the combined processing unit 147 and memory 160 can be arranged in a manner similar to reader chip 100. In other words, the integrated circuit 146 can incorporate the reader chip 100 to obtain the functions of processing unit 147 and memory 160. If the reader chip 100 is incorporated into the integrated circuit 146, certain features of the reader chip 100 may have to be modified to incorporate the necessary functionality to perform operations at the payment device 10.

Figure 5:
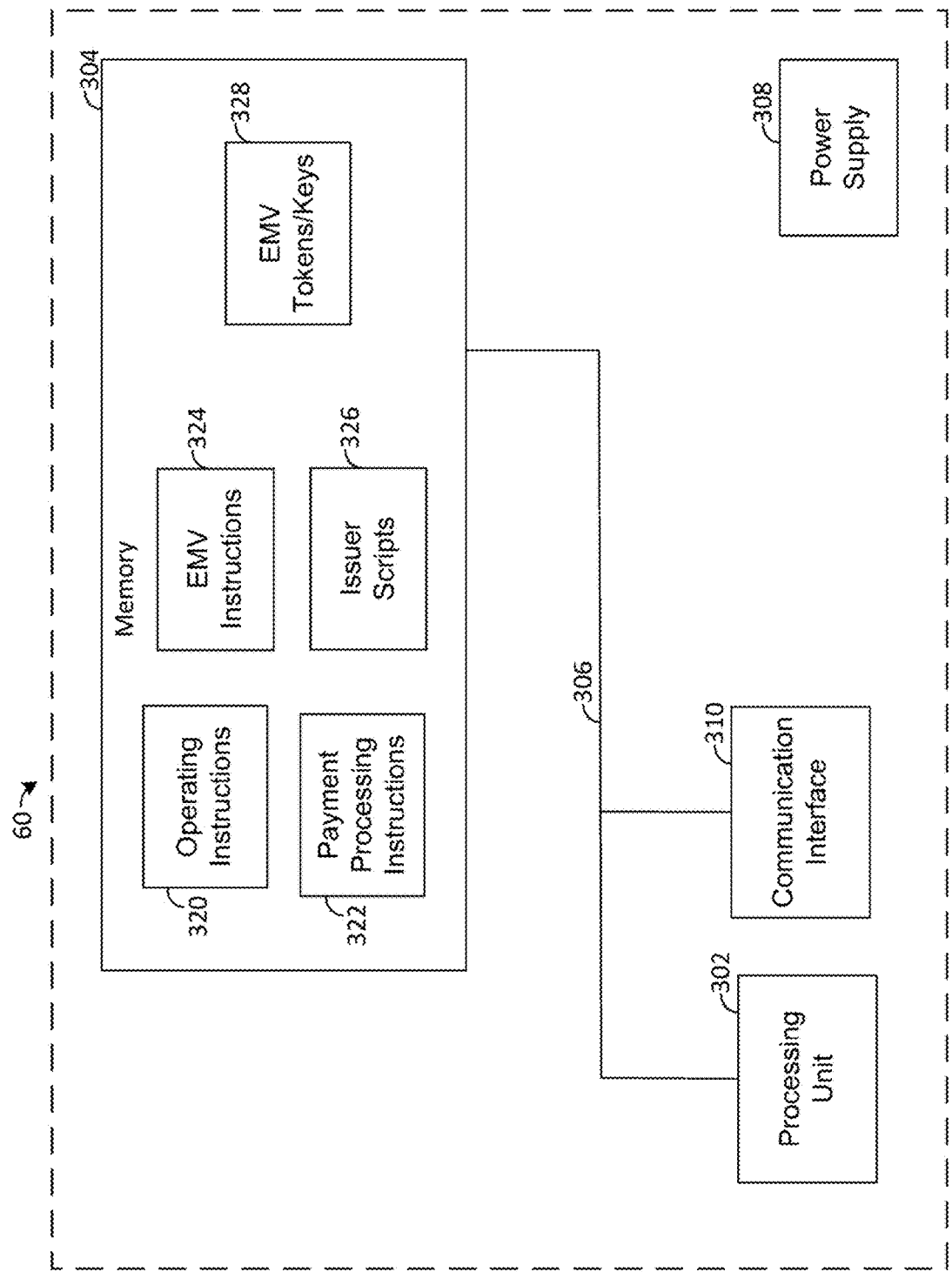
FIG. 5 depicts an illustrative block diagram of an issuer server in accordance with some embodiments of the present disclosure.

FIG. 5 depicts an exemplary issuer or bank server 60 of a payment server 40 in accordance with some embodiments of the present disclosure. Although the issuer server 60 is depicted as a single server, it will be understood that the operations and memory of the issuer server 60 may be distributed over any suitable number of servers. Although particular components are depicted in a particular arrangement in FIG. 5, it will be understood that the issuer server 60 may include additional components, one or more of the components depicted in FIG. 5 may not be included in the issuer server 60, and the components of issuer server 60 may be rearranged in any suitable manner. It will also be understood that, in some embodiments, issuer server 60 may include the necessary components and have the necessary configuration to perform any of the functionality attributed to the payment server 40 herein. In one embodiment, issuer server 60 includes at least a processing unit 302, a memory 304, an interface bus 306, a power supply 308, and a communication interface 310.

In one embodiment, the issuer server 60 includes a processing unit 302 and memory 304 that are configured to control and perform the necessary operations of the issuer server 60. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the issuer server 60. In one embodiment, the memory may include a plurality of sets of instructions, including but not limited to operating instructions 320, payment processing instructions 322, and EMV instructions 324.

Memory 304 may also include issuer scripts 326 and EMV tokens/keys storage 328. The EMV tokens/keys storage can provide for storage of preselected tokens or keys for EMV transactions, as well as instructions, rules and related information for the dynamic generation of a token or key for an EMV transaction. Issuer scripts 326 can provide for storage of software routines or programs to enable the issuer to affect the payment device 10. An issuer script from issuer scripts 326 can be provided to the payment device 10 by the issuer server 60 in order to have the payment device 10 perform certain activities. For example, the issuer script can be used to have the payment device 10 replenish a token or key stored by the payment device 10 or, alternatively, store new tokens or keys at the payment device 10. Other uses for issuer scripts include resetting or changing a PIN (personal identification number) associated with the payment device 10, updating an application on the payment device or changing data such as an expiration date or credit limit associated with payment information stored by the payment device 10.

In an embodiment, an issuer script from issuer scripts 326 can be used to reprogram the payment device 10 to utilize temporary tokens or keys instead of a permanent key or token that may have been stored by the payment device 10. In other words, the payment device 10 can disregard the permanent key and use the temporary tokens or keys. The reprogrammed payment device can then be operated to use temporary tokens or keys in a manner similar to that described herein regarding the use of temporary tokens by the payment device 10. In order to reprogram a payment device 10, the issuer server 60 can provide a first issuer script from issuer scripts 326 to be executed by the payment device 10 to reconfigure the payment device 10 to operate with temporary tokens or keys. Once the payment device 10 confirms that the payment device 10 has been reconfigured for temporary tokens or keys, the issuer server 60 can provide a second issuer script from issuer scripts 326 to be executed by the payment device 10 in order to store the temporary token or key on the payment device 10.

The processing unit 302 may execute the instructions of memory 304 to interact with and control one or more other components of the issuer server 60. Although the processing unit 302 may communicate with other components of the issuer server 60 in any suitable manner, in one embodiment the processing unit 302 may utilize an interface bus 306. Interface bus 306 may include one or more communication buses such as I2C, SPI, USB, UART, and GPIO. In one embodiment, the processing unit 302 may execute instructions of the memory 304 and based on those instructions may communicate with the other components of the issuer server 60 via the communication buses of interface bus 306.

The issuer server 60 may also include a power supply 308. Power supply 308 may include power conversion circuitry for converting AC power and/or generating a plurality of DC voltages for use by components of the issuer server 60. In some embodiments, power supply 308 may include a backup system such as a battery backup, to avoid interruptions in service during power outages. Although not depicted as physically connected to the other components of the issuer server 60 in FIG. 5, power supply 308 may supply a variety of voltages to the components of the issuer server 60 in accordance with the requirements of those components.

The issuer server 60 may also include a communication interface 310. Although communication interface 310 may include any suitable communication interface or combination thereof, in some embodiments, the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., payment reader 22 via merchant device 29) in order to exchange messages relating to transactions to be processed, record acquisition and processing, firmware updates, application updates, etc. The communication interface 310 may also communicate with other servers or systems of the payment server 40, which may, in some embodiments, be located remotely from the issuer server 60 and operated by different entities than those that control the issuer server 60. For example, in one embodiment, the issuer server 60 can communicate with the payment terminal 20 via a payment service system 50. The payment service system 50 may be operated by an entity that provides one or more of the payment reader 22, merchant device 29, or point-of-sale application.

Memory 304 may include a plurality of data stores and a plurality of sets of instructions for performing the processing operations of the issuer server 60, such as operating instructions 320, payment processing instructions 322, EMV instructions 324, EMV tokens/keys storage 328, and other suitable instructions and data stores for use in operating the issuer server 60 (e.g., instructions related to the operation of one or more other applications or components of the issuer server 60).

Operating instructions 320 may include instructions for controlling suitable general operations of the issuer server 60, such as internal communications, power management, control of communication devices, control of other hardware of the issuer server 60, any other suitable instructions, or any combination thereof. In one embodiment, the operating instructions may provide instructions for the operating system of the issuer server 60 as well as most drivers, programs, and applications operating on the issuer server 60.

Operating instructions 320 may also include instructions for interacting with a payment service system 50 and/or payment terminal 20. In one embodiment, the issuer server 60 may communicate with the payment service system 50 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the payment service system 50, merchant device 29, and/or payment reader 22 (e.g., via merchant device 29). In one embodiment, the payment processing instructions may include information about each payment reader 22 and merchant device 29 having an installed point-of-sale application. Payment processing instructions 322 may also include instructions for accessing encryption keys such as a shared private key or a key of a public/private key pair for encrypting and decrypting data provided by one or more of a payment device 10, payment reader 22, or merchant device 29.

EMV tokens/keys storage 328 may provide a repository for storage of preselected tokens/keys for payment devices 10 that can be used in EMV payment transactions, instructions for dynamically generating a token or key for a payment device 10 that can be used in an EMV payment transaction and other related data.

EMV instructions 324 may assist with EMV data and record requests during payment transactions with connected payment terminals 22. EMV instructions 324 may also assist with predictive requesting of data or records, execution of rules for identifying records, parallel processing of payment transaction steps, and identification of information that may be used to determine likely record locations and data utilization (e.g., customer information, etc.). In one embodiment, EMV instructions 324 can include information relating EMV transactions, EMV record and data object processing rules and rules for processing transactions based on such information and rules.

In an embodiment, the EMV instructions 324 can include anti-tampering instructions that can determine whether a tamper event has occurred at the payment device 10. The anti-tampering instructions can compare corresponding physical information obtained from the payment device in conjunction with the token or key with stored physical information about the payment device associated with the token or key. If the information does not match, the issuer server 60 can determine that a tamper event has occurred at the payment device 10. In response to a determination of a tamper event at the payment device 10, the issuer server 60 will not authorize payment transactions using the payment device 10 and will not provide a new token or key to the payment device 10.

In an embodiment, the EMV instructions 324 can also include instruction for processing tokens. The EMV instructions 324 can tokenize a key or other information stored in memory 304 for transmission to the payment reader 22 and/or payment device 10. Similarly, the EMV instructions 324 can also de-tokenize any received tokens and stored the corresponding key or other information in memory 304.

Figures 6, 7:
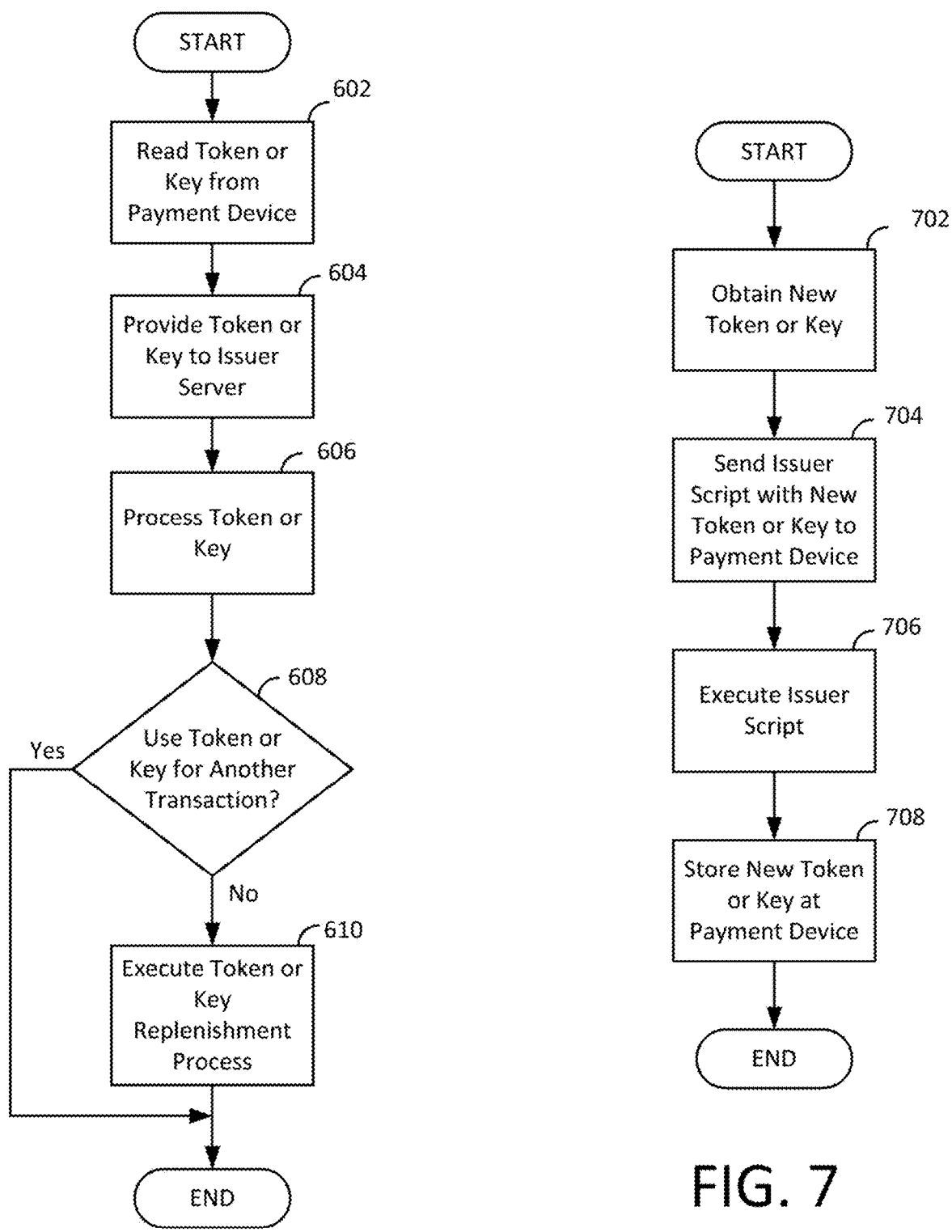
FIG. 6 depicts a non-limiting flow diagram illustrating exemplary steps for processing of a token or key from a payment device in accordance with some embodiments of the present disclosure.
FIG. 7 depicts a non-limiting flow diagram illustrating exemplary steps for replenishing a token or key for a payment device in accordance with some embodiments of the present disclosure.

In view of the structures and devices described supra, methods that can be implemented in accordance with the disclosed subject matter will be better appreciated with reference to the flowcharts of FIGS. 6-7. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a non-limiting flow diagram illustrating exemplary steps for processing of a token or key from a payment device in accordance with some embodiments of the present disclosure. In one embodiment, the processing steps of FIG. 6 can be performed as part of performing a payment transaction with the payment device.

Processing of FIG. 6 may start at step 602 by the payment reader 22 acquiring or reading the token or key for the payment device 10. The payment reader 22 can read the token or key from the payment device 10 when the payment device 10 is inserted in the slot of the payment reader 22, if the payment device 10 has an EMV chip. Alternatively, the payment reader 22 can read the token or key from the payment device 10 when the payment device 10 is inductively coupled (or tapped) at the payment reader 22 to enable wireless communication between the payment device 10 and the payment reader 22. In an embodiment, the payment reader 22 can also read other payment and/or transaction information from the payment device 10 that is used in the payment transaction process. Once the token or key (and any other information) has been read, processing may continue to step 604.

At step 604, the payment reader 22 can provide the token or key to the issuer server 60. The payment reader may communicate the token or key to the merchant device 29 and/or a payment service system 50 in order to provide the token or key to the issuer server 60. In one embodiment, the payment reader 22 can include additional information associated with a payment transaction when providing the token or key to the issuer server 60. Once the issuer server 60 receives the token or key, processing may continue to step 606.

At step 606, the issuer server 60 processes the token or key from the payment reader 22. In one embodiment, the issuer server 60 can process the token or key as part of a payment transaction and can determine if the payment transaction is authorized based on the token or key. In another embodiment, the issuer server 60 can use the token or key as part of an anti-tampering mechanism, as discussed above, to determine if a tamper event has occurred at the payment device 10. Once the token or key has been processed by the issuer server, processing may continue to step 608.

At step 608, the issuer server 60 can determine if the token or key stored by the payment device 10 can be used for another payment transaction. The issuer server 60 can determine if the token or key has been used for the number of payment transactions for which it has been authorized. If the token or key has been used for fewer than the number of payment transactions for which it has been authorized, the token or key can be used for one or more further payment transactions. If the token or key can be used for another payment transaction, the process ends. However, if the token or key has reached the number of payment transactions for which it has been authorized, the current token or key cannot be used for another payment transaction and a new token or key must be used if the payment device is going to be used to process another payment transaction. If the token or key cannot be used for another payment transaction, processing may continue to step 610. In one embodiment, the token or key can be used for single transaction before having to be replenished. However, in other embodiments, the token or key can be used multiple times before having to be replenished.

In an embodiment, if the payment transaction is authorized and the token or key is only authorized for a single payment transaction, step 608 may be skipped and the issuer server 60 can proceed directly to step 610 to replenish the token or key at the payment device 10.

At step 610, the issuer server executes a replenishment process in order to provide the payment device 10 with a new token or key. In one embodiment, the issuer server can execute the process of FIG. 7 to replenish the token or key of the payment device 10. However, in other embodiments, other techniques can be used to replenish the token or key of the payment device. Once the token or key have been replenished, the process can end.

In an embodiment, step 608 and step 610 (if required by step 608) can be performed prior to the processing of the token or key as part of the payment transaction in step 606. The issuer server 60 can determine whether the token or key can be used for a payment transaction prior to attempting to authorize the payment transaction. If the token or key is not authorized for a payment transaction, the issuer server 60 can execute the token replenishment process of step 610 to provide the payment device 10 with a new token or key prior to processing the payment transaction. The payment device 10 can then use the newly replenished token or key for the payment transaction. In another embodiment, the issuer server 60 may execute the anti-tampering instructions to confirm the integrity of the payment device 10 prior to any processing, evaluation or replenishment of the token or key.

In another embodiment, the process of FIG. 6 can be performed on a payment device 10 without the payment device 10 being used for a payment transaction. In other words, the process of FIG. 6 can be used as a stand-alone token or key replenishment station. For example, the user may select an option at the payment terminal 20 to validate or authorize the payment device 10 (instead of performing a payment transaction) and the process can proceed as described above with the omission of any payment transaction processing steps.

FIG. 7 depicts a non-limiting flow diagram illustrating exemplary steps for replenishing a token or key for a payment device in accordance with some embodiments of the present disclosure. In one embodiment, the steps of FIG. 7 may be used to perform the replenishment process of step 610 of FIG. 6. In exemplary embodiments, the processing steps of FIG. 7 may be performed to replenish the temporary token or key of an EMV card, a NFC device, or another payment device with an EMV chip. In a further embodiment, the processing steps of FIG. 7 can be used as part of the process to convert a payment device using a permanent token or key to a payment device that uses temporary tokens or keys.

Processing may begin at step 702, at which the issuer server 60 obtains a new token or key for the payment device 10 (e.g., an EMV card 14 or a NFC device 12). The issuer server 60 can store a plurality of tokens or keys in EMV tokens/keys storage 328 of memory 304 and the EMV instructions can retrieve a token or key from the EMV tokens/keys storage 328. In another embodiment, the token or key can be dynamically generated in real-time based on EMV instructions 324 and/or instructions stored in EMV tokens/keys storage 328. Once the token or key has been obtained, processing may continue to step 704.

At step 704, the issuer server 60 can send an issuer script from issuer scripts 326 and the obtained token or key (or tokens or keys, if more than one token or key is being provided) to the payment device 10. The issuer server 60 can send the issuer script and the corresponding new token or key to the payment terminal 20, which can then provide the issuer script and new token or key to the payment device 10 via the payment reader 22. If the payment device 10 is an EMV card 14 or includes an EMV chip, the issuer script and the token or key can be provided to the payment device 10 when the EMV chip is inserted in the slot of the payment reader 22. If the payment device 10 is an NFC device 12, the payment terminal 20 can instruct the owner of the payment device 10 to inductively couple (or "tap") the NFC device 12 at the payment reader 22 so the NFC device 12 and the payment reader 22 can wirelessly exchange information. Once the payment device 10 receives the issuer script and the token or key, processing may continue to step 706.

At step 706, the payment device 10 executes the issuer script in accordance with EMV instructions 166. The execution of the issuer script by the payment device 10 results in the storage of the associated token or key in tokens/keys storage 164 in step 708. In an embodiment, the token or key can be stored in tokens/keys storage 164 with a PUT DATA command. By storing the token or key in the tokens/keys storage 164, the issuer script replenishes the token or key for the payment device 10 enabling the payment device 10 to be used for subsequent payment transactions. In one embodiment, the replenishment of the token or key can involve the deletion of the prior token or key from the tokens/keys storage 164. In another embodiment, the prior token or key can remain in tokens/keys storage 164 for a preselected period (e.g., a predetermined time period and/or after a predetermined number of new tokens or keys have been stored in tokens/keys storage 164). Once the token or key is replenished, the processing of FIG. 7 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for replenishing tokens in an electronic transaction card, comprising:
    an electronic transaction card having a chip with a card processing unit and card memory, the card memory configured to store an authentication token for use in authenticating the electronic transaction card during a payment transaction;
    a card reader having reader circuitry configured to interface with the chip of the electronic transaction card in response to insertion of the electronic transaction card into the card reader, the reader circuitry configured to obtain the authentication token stored in the memory of the electronic transaction card during the payment transaction;
    an issuer server communicatively coupled to the card reader to receive the obtained authentication token from the card reader during processing of the payment transaction, the issuer server having a server processing unit and a server memory, the server memory configured to store a plurality of new authentication tokens to facilitate processing of subsequent payment transactions, the server processing unit configured to determine, based on the authentication token received from the payment reader, whether to proceed with authorizing the payment transaction and whether the authentication token is valid for a subsequent payment transaction, the server processing unit configured to provide an issuer script and a new authentication token of the plurality of new authentication tokens to the card reader for the electronic transaction card upon a determination that the authentication token is invalid for the subsequent payment transaction, the issuer script including an instruction for the card processing unit to store the new authentication token in card memory; and
    the card reader configured to provide the issuer script and the new authentication token received from the issuer server to the electronic transaction card via a communication path between the card reader and the electronic transaction card while the chip of the electronic transaction card is interfaced with the reader circuitry of the card reader, the card processing unit configured to execute the issuer script, while the electronic transaction card is inserted in the card reader, to store the new authentication token from the issuer server in the card memory for use in the subsequent payment transaction.

2. The system of claim 1, wherein the authentication token is valid for a single payment transaction.

3. The system of claim 1, wherein the server processing unit is configured to determine, based on the authentication token received from the payment reader, whether a tamper event has occurred at the electronic transaction card prior to determining whether to authorize the payment transaction or determining whether the authentication token is valid for the subsequent payment transaction.

4. The system of claim 1, wherein the electronic transaction card receives power from the card reader while the electronic transaction card is inserted in the card reader.

5. A system for replenishing tokens in a payment device, comprising:
    a payment device having a payment device processing unit and payment device memory, the payment device memory configured to store an authentication token for use in authenticating the payment device during a payment transaction;
    a reader device having reader circuitry configured to interface with the payment device, the reader circuitry configured to obtain the authentication token stored in the payment device memory during the payment transaction when the reader circuitry is interfaced with the payment device;
    a server communicatively coupled to the reader device to receive the obtained authentication token from the reader device during processing of the payment transaction, the server having a server processing unit and a server memory, the server processing unit configured to determine, based on the authentication token received from the reader device, whether to proceed with authorizing the payment transaction, the server processing unit configured to provide to the reader device a script and a new authentication token for the payment device, the script including an instruction for the payment device processing unit to store the new authentication token in the payment device memory; and
    the reader device configured to provide the script and the new authentication token received from the server to the payment device via a communication path between the reader device and the payment device when the reader circuitry is interfaced with the payment device, the payment device processing unit configured to execute the script, when the reader circuitry is interfaced with the payment device, to store the new authentication token from the server in the payment device memory for use in a subsequent payment transaction.

6. The system of claim 5, wherein the payment device is a near field communication (NFC) device.

7. The system of claim 6, wherein the NFC device interfaces with the reader circuitry by inductive coupling to enable wireless communication between the reader device and the NFC device.

8. The system of claim 5, wherein the payment device is a payment card comprising a chip.

9. The system of claim 8, wherein the payment card interfaces with the reader circuitry by inserting the payment card into a corresponding slot of the reader device to enable contacts of the chip to engage with corresponding contacts of the reader circuitry.

10. The system of claim 5, wherein the server processing unit is configured to determine, based on the authentication token received from the reader device, whether a tamper event has occurred at the payment device.

11. The system of claim 10, wherein the server processing unit is configured to determine a tamper event at the payment device by comparing information about the payment device provided to the server with stored information about the payment device, wherein the stored information about the payment device is associated with the authentication token.

12. The system of claim 5, wherein the new authentication token is stored in the server memory of the server.

13. The system of claim 5, wherein the new authentication token is dynamically generated by the server.

14. The system of claim 5, wherein the script is a first script and the payment device is a first payment device, the system further comprises:
  a second payment device storing a predetermined authentication token used for each payment transaction associated with the second payment device;
  the server processing unit configured to provide the second payment device a second script upon a determination that the second payment device is to be reconfigured for subsequent payment transactions; and
  the second payment device configured to execute the second script to reconfigure the second payment device to stop using the predetermined authentication token for subsequent payment transactions and to use authentication tokens provided by the server for the subsequent payment transactions.

15. The system of claim 5, wherein the authentication token includes a key that authenticates the payment device.

16. A method for replenishing temporary tokens in a payment device, comprising:
  storing a temporary authentication token in a memory of a payment device, the temporary authentication token configured for use in authenticating the payment device during a payment transaction;
  coupling the payment device to a reader device during a payment transaction;
  obtaining the temporary authentication token of the payment device with reader circuitry of the reader device when the payment device is coupled to the reader device;
  receiving, by a server, the obtained temporary authentication token from the reader device during the payment transaction;
  determining, by the server, whether to proceed with authorizing the payment transaction based on the received temporary authentication token;
  providing, by the server, a script and a new temporary authentication token to the reader device for the payment device, the script including an instruction for a processing unit of the payment device to store the new temporary authentication token in the memory of the payment device;
  communicating, by the reader device, the script and the new temporary authentication token received from the server to the payment device via a communication path between the reader device and the payment device when the payment device is coupled to the reader device;
  executing, by the payment device, the script communicated by the reader device when the payment device is coupled to the reader device; and
  storing, upon execution of the script by the payment device, the new temporary authentication token in the memory of the payment device for use in a subsequent payment transaction.

17. The method of claim 16, wherein the payment device is a near field communication (NFC) device.

18. The method of claim 17, wherein the coupling the payment device to a reader device includes inductively coupling the NFC device with the reader device to enable wireless communication between the reader device and the NFC device.

19. The method of claim 16, wherein the payment device is a payment card comprising a chip.

20. The method of claim 19, wherein the coupling the payment device to a reader device includes inserting the payment card into a corresponding slot of the reader device to enable contacts of the chip to engage with corresponding contracts of the reader device.

21. The method of claim 16, further comprising determining, by the server, whether a tamper event has occurred at the payment device based on the temporary authentication token received from the reader device.

22. The method of claim 21, wherein the determining whether a tamper event has occurred at the payment device includes comparing information about the payment device provided to the server with stored information about the payment device, wherein the stored information about the payment device is associated with the temporary authentication token.

23. The method of claim 16, wherein the providing the script and the new temporary authentication token includes retrieving the new temporary authentication token from server memory in the server.

24. The method of claim 16, wherein the providing the script and the new temporary authentication token includes dynamically generating the new temporary authentication token by the server.

25. The method of claim 16, wherein the script is a first script and the payment device is a first payment device, the method further comprises:
  determining, by the server, whether a second payment device is to be reconfigured for subsequent payment transactions, the second payment device storing a predetermined authentication token for each payment transaction associated with the second payment device;
  providing, by the server, a second script to the second payment device upon a determination that the second payment device is to be reconfigured; and
  executing, by the second payment device, the second script to reconfigure the second payment device to stop using the predetermined authentication token for subsequent payment transactions and to use temporary authentication tokens provided by the server for subsequent payment transactions.

26. A payment server for processing payment transactions, comprising:
  a communication interface configured to communicate with a payment terminal to exchange information with the payment terminal during a payment transaction, wherein the communication interface receives an authentication token from the payment terminal to authenticate a payment device during the payment transaction, wherein the communication interface sends a script and a new authentication token to the payment device via the payment terminal during or after the payment transaction, the script including at least one instruction for a device processing unit of the payment device to store the new authentication token in token memory of the payment device;
  a processing unit coupled to the communication interface;
  memory coupled to the processing unit, the memory having a plurality of instructions, wherein, when executed by the processing unit, the plurality of instructions cause the processing unit to:
    determine, based on the authentication token associated with the payment device, whether to proceed with authorizing the payment transaction; and
    provide the script and the new authentication token to the payment device via a communication path between the payment terminal and the payment device when the payment device is coupled to the payment terminal, wherein execution of the script by the device processing unit of the payment device, when the payment device is coupled to the payment terminal, stores the new authentication token in the payment device for use in a subsequent payment transaction.

27. The payment server of claim 26, wherein the plurality of instructions cause the processing unit to retrieve the new authentication token from memory.

28. The payment server of claim 26, wherein the plurality of instructions cause the processing unit to dynamically generate the new authentication token.

29. The payment server of claim 26, wherein the plurality of instructions cause the processing unit to determine whether a tamper event has occurred at the payment device based on the authentication token associated with the payment device.

30. The payment server of claim 29, wherein the plurality of instructions cause the processing unit to compare information relating to the payment device stored in memory with information relating to the payment device received from the communication interface to determine an occurrence of a tamper event.

31. The payment server of claim 26, wherein the script is a first script and the payment device is a first payment device and the plurality of instructions cause the processing unit to provide a second script to a second payment device having a predetermined authentication token for payment transactions, wherein execution of the second script causes the second payment device to disregard the predetermined authentication token and to use new authentication tokens provided by the payment server for subsequent payment transactions.

* * * * *